Aug. 25, 1959   A. J. TAYLOR ET AL   2,901,201
MATERIAL HANDLING FIXTURE
Filed Feb. 20, 1956   3 Sheets-Sheet 1

INVENTORS
Allan J. Taylor
Anthony Toth
Their Patent Attorneys

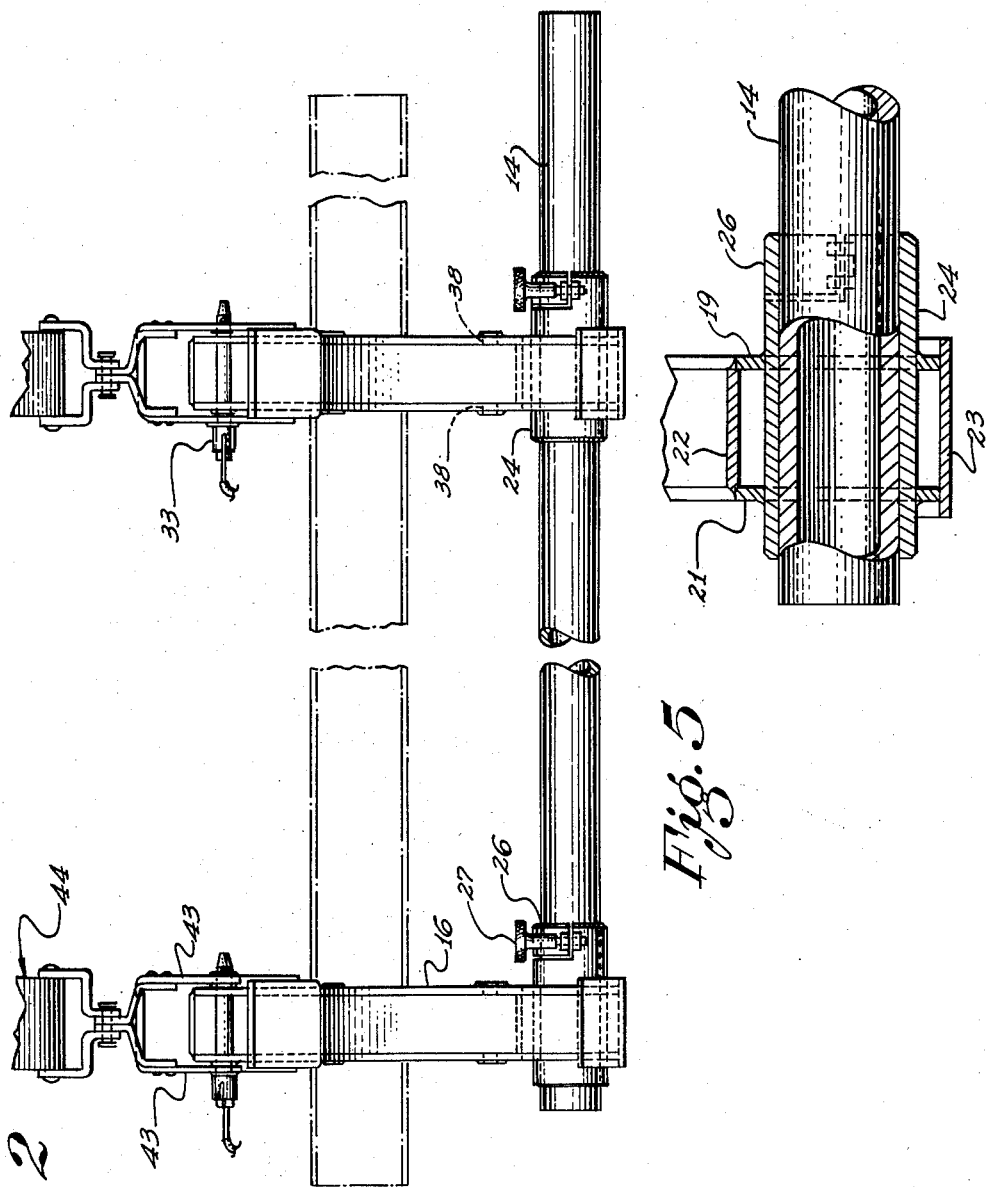

Aug. 25, 1959 A. J. TAYLOR ET AL 2,901,201
MATERIAL HANDLING FIXTURE
Filed Feb. 20, 1956 3 Sheets-Sheet 3

INVENTORS.
Allan J. Taylor
Anthony Toth
By Herbert E. Metcalf
Their Patent Attorney

United States Patent Office 2,901,201
Patented Aug. 25, 1959

2,901,201

MATERIAL HANDLING FIXTURE

Allan J. Taylor, Pacific Palisades, and Anthony Toth, Compton, Calif., assignors to Northrop Corporation, Hawthorne, Calif., a corporation of California Application February 20, 1956, Serial No. 566,586

1 Claim. (Cl. 248—119)

This invention relates to material handling fixtures and more particularly to a manually and partially self-adjusting material handling fixture, the self adjusting feature allowing the fixture to partially conform to the cross-sectional configuration of components received therein.

Elevating and transportation type trailers or dollies, of the types disclosed in copending application Serial Number 543,506, filed October 28, 1955, now Patent No. 2,848,242, are at present extensively utilized by the armed services in the installation, removal, and handling of aircraft components and the like. In some instances this type of equipment has become popular through necessity and in others because it provides a more efficient and economical means of handling the aforementioned components than has hitherto been available. In either case the supporting fixtures or adapters enabling various components of an aircraft or the like to be supported on a trailer are normally constructed and positioned to receive only one specific type of equipment. Therefore a plurality of supporting fixtures are required according to the the number and configuration of the components to be handled.

The present invention discloses an adjustable and somewhat self-conforming material handling fixture having both general utility and specific usefulness in connection with trailers of the aforementioned types. Briefly the present fixture consists of a pair of arch members movably mounted on an elongated member in an inverted position so that they may be moved longitudinally on the elongated member with respect to each other. The arch members are of such construction that they may be mounted on a standard type trailer or they may be stored per se without the use of special or auxiliary equipment and without damage to the equipment contained therein. Additional flexibility is incorporated in the fixture in that a pair of individual supporting pads are pivotally and adjustably mounted on each leg of the arch members. These individual pads adjust themselves to the contour of the part being supported by the fixtures regardless of its size and shape.

Accordingly it is an object of the present invention to provide a material handling fixture having both general and specific utility.

Another object is to provide a material handling fixture certain components of which can be adjusted in accordance with the configuration of the components the fixture is required to support.

Another object is to provide a material handling fixture certain components of which adjust themselves to conform somewhat with the configuration of the components the fixture is required to support.

Another object is to provide a material handling fixture adapted to be readily mounted on a typical trailer or stowed per se on a flat horizontal surface.

Another object is to provide a material handling fixture which is light in weight, that is simple in design yet rugged in construction, which is economical to manufacture, and which may be easily adapted to any purpose for which it is intended.

Although the characteristic features of the present invention are particularly pointed out in the appended claim, the invention itself, also the manner in which it may be carried out, will be better understood by referring to the following description taken in connection with the accompanying drawings forming a part of this application and in which:

Figure 2 is a side elevational view of the supporting fixture of Figure 1.

Figure 5 is a cross-sectional view of the cross-beam taken along the line 5—5 of Figure 3.

Figure 1:
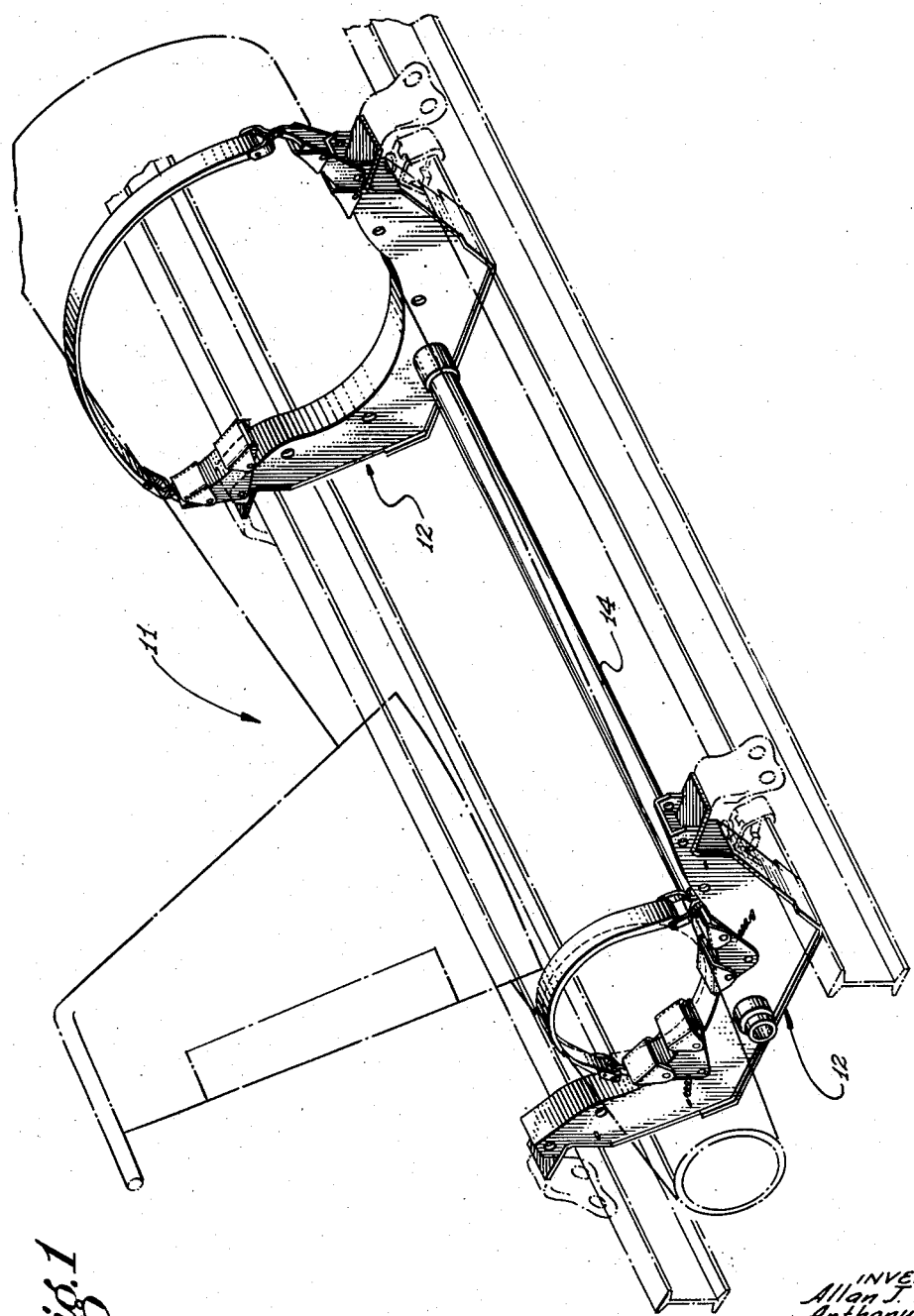
Figure 1 is a perspective view of the material handling and supporting fixture as disclosed herein, the fixture in this view is shown in its mounted position on the supporting rails of a typical trailer.
Figure 4:
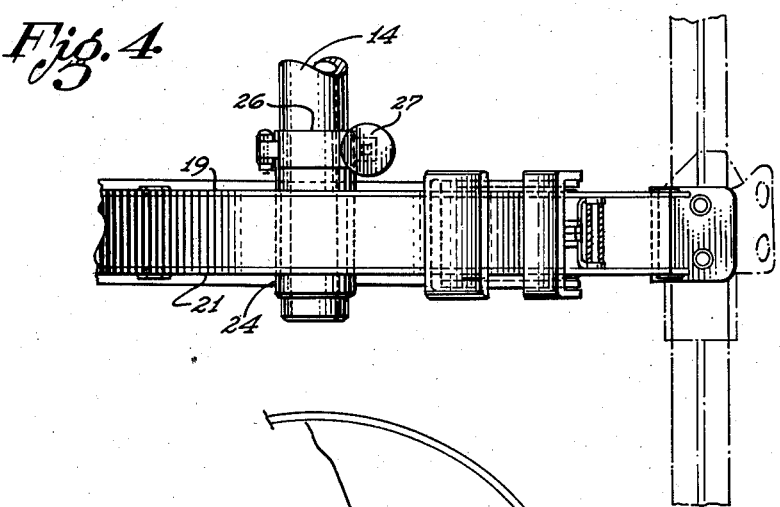
Figures 3 and 4 are fragmentary side and plan views, respectively, of one of the arch member assemblies of Figures 1 or 2.

Referring now to the drawings, Figure 1 illustrates one specific embodiment of the material handling fixture as disclosed herein. In this view the material handling fixture (identified in its entirety by the numeral 11) is mounted in an operational attitude on the side rails of a typical trailer and in general consists of a pair of cross-member assemblies 12 adjustably mounted on an elongated member 14.

Since the pair of assemblies 12 are of identical design and construction a detailed description of one will also be applicable to the other. One of the assemblies includes a cross-beam 16 which resembles an inverted arch as normally poistioned and as viewed in Figure 3. The cross-beam is characterized by having a crown portion 17 and leg portions 18, the latter portions diverging outwardly as they extend upwardly from the crown portion. The cross-beam of box type construction being built up of any suitable light weight sheet or plate material as best seen in Figure 5. Accordingly it will be noted that the cross-beam is of hollow construction consisting of side plates 19 and 21, having a parallel relationship with respect to each other, and inner and outer contoured plates 22 and 23, respectively. Construction of the cross-beam in this manner renders it extremely light in weight yet rugged and durable in construction.

Figure 3:
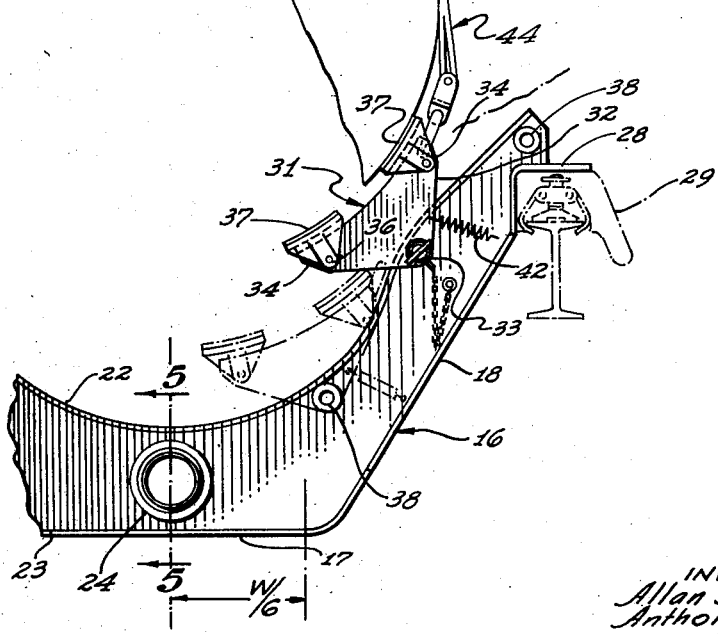

The lower inner contour of the crown portion 17, as viewed in Figure 3, is of substantially circular configuration. The lower outer portion of the crown 17, however, constitutes a plane flat surface, the latter being parallel to the axis of the member 14 and extending equal distances on each side of the vertical center line of the cross-beams 16. The equal distances as referred to above are at least equal to one-sixth of the overall width of the cross-beams 16 as indicated by the dimension W/6 in Figure 3. The surface thus defined is of sufficiently large area to provide a stable supporting surface for the cross-beam and consequently the fixture 11.

Passing through the crown portion of the cross-beam 16, and extending beyond the outer faces of the plates 19 and 21 in a normal direction, is a sleeve member 24 adapted to slidably receive the aforementioned elongated member 14, the latter constituting a tubular member and will hereinafter be referred to as such. The upper half of the sleeve member 24 has been removed adjacent one of its ends. Pivotally attached to the remaining lower half of the sleeve member is a cap member 26. In the assembled position of the member 24 a threaded hand screw 27 is associated therewith. Upon proper adjustment of the hand screw the cap member is urged into the clamping relation with the lower portion of the sleeve member and thereby releasably secures the cross-beam 16 at any desired position lengthwise of the tubular member 14.

Mounted adjacent the outer ends of each of the leg portions 18 is an angular bracket member 28. The member 28 consists of horizontal and vertical leg portions extending normal to the side plates 19 and 21 and which are adapted to receive a roller assembly 29 of the type disclosed in copending application Serial Number 543,506, filed Oct. 28, 1955. The cross-beam is normally secured to the roller assembly 29 by means of studs or the like passing through the horizontal leg of the member 28 and threadably engaging the frame of the roller assembly.

Thus it will be seen that a supporting member is provided having the general configuration of an inverted arch. The construction of the cross-beam provides considerable depth and diverging width for receiving components which may be handled by the fixture 11. Also the cross-beam constructed in this manner provides ample protection for a component received therein regardless of whether the completed fixture is utilized for storage purposes per se or utilized in connection with a typical trailer.

Pivotally mounted on the leg portions of the cross-beam 16 and extending inwardly from each of the legs thereof is a support assembly 31. Each of the assemblies 31 include a bracket member 32 having substantially the configuration of an equilateral triangle when viewed in side elevation and which is U-shaped in cross-section. The leg portions of the member 32 span the leg portions of the cross-beam 16, substantially as shown in Figure 3, and are pivotally attached thereto by a removable pin 33. Pivotally mounted adjacent the outer apices of the member 32 are individuall support members 34. The members 34 are also of triangular configuration when viewed in side elevation and are also U-shaped in cross-section. The leg portions of the individual support members 34 span the member 32 and are pivotally attached thereto by respective pins 36.

The outermost surfaces of the support members 34 are of arcuate configuration to favorably mate with the contour of components which the complete fixture is expected to receive. A pad 37 of rubber or other similar resilient material covers the outer arcuate faces of the individual support members to provide proper protection for components received therein. The inner surfaces of the arcuate portions of the members 34 are spaced sufficiently from the outer faces of the member 32 to allow limited pivotal or rocking movement.

In Figure 3 the assemblies 31 are shown as being pivotally attached to the leg portions 18 at approximately their midpoints lengthwise. The pivotal connection is effected by the aforementioned pin 33 passing through aligned apertures 38 provided in the side plates 19 and 21. Two additional pairs of aligned apertures 38, one pair located adjacent the crown portion 17 and the other pair located adjacent the outer end of the leg portion, are provided in each leg portion 18. These apertures permit the assemblies 31 to be moved closer together or farther apart and lengthwise of the leg portions 18. The pins 33 may be withdrawn from the apertures 38 and moved to a new location at such times as the assemblies 31 are moved. The assemblies 31 are retained in a desired angular position with respect to the cross-beams 16 by means of helical springs 42 which are also easily movable to various locations along the leg portions of the cross-beams.

Secured to a pair of attached members 43, extending from the uppermost side portions of the support members 32, is one end of a strap assembly 44 by means of which components may be secured in the complete fixture. The ends of the strap assembly secured at these particular locations insures a contacting relationship between the belt assembly and components received in the fixture regardless of its size. This, for example, would not be the case if the strap ends were secured to the outer ends of the leg portions 18 and if components having small measurements were positioned in the fixture.

With the two assemblies 12 mounted on the tubular member 14 it will be apparent the assemblies may be adjusted lengthwise on the member 14 and releasably secured thereon at any desired location to accommodate components of various lengths. Also the support assemblies 31 may be positioned at various locations on the leg portions 18 to receive components having various cross-sectional configurations.

Further adjustments of the assemblies 31 may be made with respect to a respective cross-beam. For example the assemblies 31, located on the forward cross-beam 16 (Figure 1), may be located in different relation with respect to the forward cross-beam than the positions of the assemblies 31 associated with the aft cross-beam. Thus the fixture may be altered laterally to receive components having different cross-sectional areas adjacent its respective supporting points. Also it will be noted that components of small cross-sectional dimensions may be supported on just one of the inner individual supporting members 34 as best seen in Figure 1. Also components of large cross-sectional dimensions may be supported on the outer individual supporting member 34 only while intermediate sized components will normally be supported on both of the members 34. In any event and regardless of the positions of the assemblies 31 on the cross-beams 16 the strap assemblies will have a firm contacting relation with a component received in the fixture.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A material handling fixture comprising: an elongated member having a longitudinal axis of symmetry; a pair of arch-like members of predetermined width and having inner and outer edges, a crown portion and leg portions; said arch-like members being adjustably mounted on said elongated member for longitudinal movement thereon and in an attitude in which said leg portions are equally spaced on opposite sides of a reference plane containing said axis of symmetry; the outer edges of said leg portions having an indentation formed therein and which extends the full width thereof; each of said indentations being defined by a first plane surface which lies in a common plane which is normal to said reference plane and a second plane surface which is parallel to and a predetermined distance from said reference plane at such times as said arch-like members are mounted on said elongated member; a support assembly mounted on and extending inwardly from the inner edge of each of said leg portions; each of said support assemblies includes a bracket member pivotally and adjustably mounted on each of said leg portions for movement thereon between a plurality of positions located lengthwise of said leg portions; a pair of individual pad members, each having an arcuate outer face, pivotally mounted on each of said bracket members; and the mounting of said bracket members on said leg portions, and individual pad members on said bracket members, being further characterized in that the arcuate faces of the individual pad members on each of said arch-like members have an opposed relation.

(References on following page)

References Cited in the file of this patent

UNITED STATES PATENTS

| | | |
|---|---|---|
| 824,586 | Rominger | June 26, 1906 |
| 1,773,327 | Thwaits | Aug. 19, 1930 |
| 1,852,925 | Gomery | Apr. 5, 1932 |
| 1,870,676 | Franklin et al. | Aug. 9, 1932 |
| 2,298,851 | Wachter | Oct. 13, 1942 |
| 2,488,368 | Bickham | Nov. 15, 1949 |
| 2,636,745 | Cartwright | Apr. 28, 1953 |

FOREIGN PATENTS

| | | |
|---|---|---|
| 1,018,386 | France | Oct. 15, 1952 |